United States Patent [19]

Casterline et al.

[11] 3,892,928

[45] July 1, 1975

[54] SWITCHING SYSTEM EQUIPPED WITH LINE VERIFICATION APPARATUS

[75] Inventors: Russell Carson Casterline, Naperville; Zbigniew Apoloniusz Krawiec, Aurora, both of Ill.; Ralph Broman Peterson, Middletown, N.J.

[73] Assignee: Bell Telephone Laboratories, Incorporated, Murray Hill, N.J.

[22] Filed: Oct. 9, 1973

[21] Appl. No.: 404,704

[52] U.S. Cl.. 179/175.2 R; 179/175.23; 179/18 AH

[51] Int. Cl. .......... H04m 3/22

[58] Field of Search... 179/175.2 R, 175.21, 175.23, 179/18 AH; 340/172.5

[56] References Cited

UNITED STATES PATENTS 3,570,008 3/1971 Downing et al. .......... 340/172.5

3,752,940 8/1973 Santulli et al. .......... 179/175.2 R

*Primary Examiner*—Kathleen H. Claffy
*Assistant Examiner*—Douglas W. Olms
*Attorney, Agent, or Firm*—J. C. Albrecht

[57] ABSTRACT

An arrangement for verifying the accuracy of connections of customer lines to an electronic switching system which is a replacement for an existing switching system is disclosed. More specifically, an electronic switching system is disclosed comprising one or more test trunk circuits, each connected by means of a "no-test" trunk to the existing switching system. Each of the test trunk circuits comprises testing means for performing selected tests in response to commands from the electronic switching system. Included in the testing means are means to detect the busy/idle state of a customer line and means for testing a busy line for proper connection to the electronic switching system.

6 Claims, 10 Drawing Figures

TEST TRUNK CCT

SWITCHING SYSTEM EQUIPPED WITH LINE VERIFICATION APPARATUS

BACKGROUND OF THE INVENTION

1. Field of the Invention

This invention relates to the field of electronic switching systems and, more specifically, to arrangements for verifying the proper connection of customer lines to an electronic switching system.

2. Description of the Prior Art

When a new switching system is to replace an existing switching system, customer lines connected to the existing switching system must also be connected to the new switching system. In general, the customer lines are parallel connected to both switching systems while the old switching system maintains service of the customer lines. The connections between the customer lines and the two switching systems are verified to minimize the possibility of service interruption when the new switching system is cut into service, replacing the existing switching system.

In the prior art, various systems have been devised for verifying the connection of a customer line to the new switching system by making connections to the customer line through each of the two switching systems. Tests are performed to determine if the two stitching system connections do, in fact, both reach the customer line. However, in the prior art no system is available which can perform verification testing when the desired customer line is busy. More specifically, in prior art systems, including those few which make a connection through the existing system to a busy line, detection of a busy customer line results in termination of verification testing of that line. Thereafter, the customer line is logged for subsequent testing when it may not be busy. In addition, due to the limited capabilities of prior art verification testing arrangements, it is also not possible to check line circuit connections in the new switching system to verify proper loop start or ground start configuration and to compare those connections to the connections of the line circuit in the existing switching system.

SUMMARY OF THE INVENTION

Applicants' invention comprises an arrangement for verifying the connection of customer lines to a replacement electronic switching system. According to applicants' invention, the replacement electronic switching system includes one or more test trunk circuits each capable of connecting selected signal sources and detection means to what is known in the prior art as a no-test trunk, connected to the existing switching system. More specifically, applicants' invention comprises an electronic switching system including one or more test trunk circuits. Each of the test trunk circuits is responsive to control signals generated within the electronic switching system to selectively connect to a test trunk and, through the electronic switching system, to a selected customer line, detection means for determining the busy/idle status of the customer line, and signal sources for testing the customer line connections if the line is busy or if it is idle. Moreover, means are also provided, responsive to control signals generated within the electronic switching system, to connect the aforementioned detection means to the test trunk circuit to determine if the line circuit in the electronic switching machine is properly in a loop start configuration or in a ground start configuration.

DESCRIPTION OF THE ILLUSTRATIVE EMBODIMENT

Figure 1:
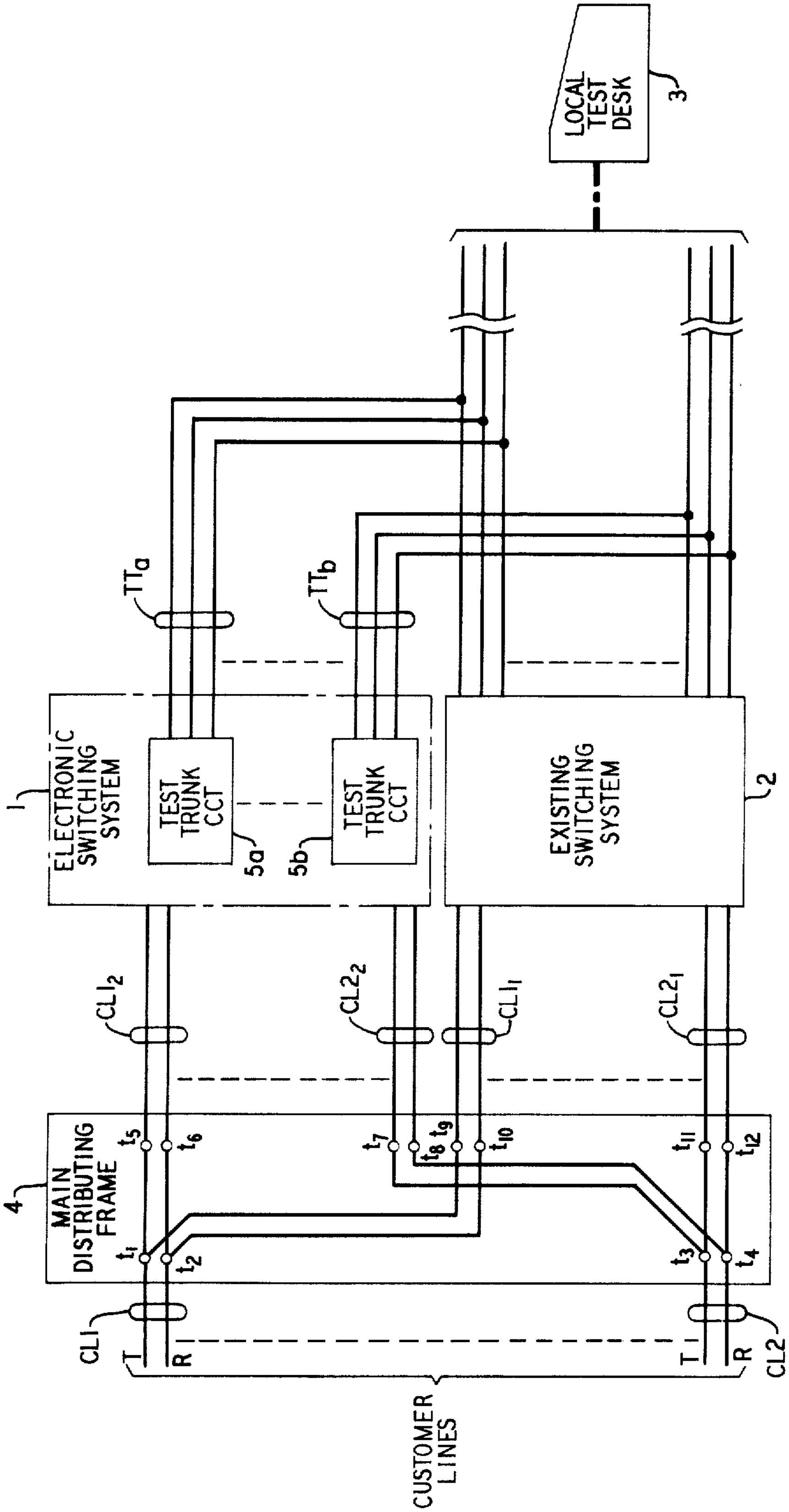
FIG. 1 shows a block diagram representation of an arrangement employing applicants' invention.

As above mentioned, applicants' invention comprises an arrangement for verifying the correct connection of customer line terminations to an electronic switching system which is replacing an existing switching system. A representation of an arrangement illustrating applicants' invention is shown in FIG. 1. It can be seen therein that the customer lines CL1 and CL2 are connected to terminals $t_1$ and $t_2$ and terminals $t_3$ and $t_4$, respectively, on the main distributing frame 4. Connections are also made on the main distributing frame from the respective terminals connected to the customer lines to other terminals used for terminating line appearances from both the electronic switching system 1 and the existing switching system 2.

More specifically, the lines $CL1_2$ and $CL2_2$ connect the terminals $t_5$ and $t_6$ and the terminals $t_7$ and $t_8$, respectively, to the electronic switching system 1. Similarly, the lines $CL1_1$ and $CL2_1$ connect the terminals $t_9$ and $t_{10}$ and the terminals $t_{11}$ and $t_{12}$, respectively, to the existing switching system 2. Connections are provided on the main distributing frame 4 between the terminals $t_1$ and $t_5$ and the terminals $t_1$ and $t_9$ and similarly between the terminals $t_2$ and $t_6$ and the terminals $t_2$ and $t_{10}$. By these connections the customer line CL1 is connected to the electronic switching system 1 and the existing switching system 2. Similar connections are provided on the main distributing frame 4 for the customer line CL2. It should be noted that for convenience of presentation only one main distributing frame 4 is shown in FIG. 1. In practice, however, a separate main distributing frame would be used for connections to each switching system and a jumper cable would be used to interconnect the two frames.

As described above, applicants' invention is directed to an arrangement for verifying that, for example, the customer line CL1 is connected properly to the electronic switching system 1. More specifically, applicants' invention is directed to an arrangement for detecting erroneous connections of lines from the electronic switching system 1 to the main distributing frame 4 and lines connecting terminals on the main distributing frame to respective customer lines. If such erroneous connections exist, it is the purpose of applicants' invention to identify the errors or the class of errors such that they may be corrected.

To facilitate the required operations to verify line connections the electronic switching system 1 is provided with test trunk circuits 5 represented by test trunk circuit $5_a$ and a test trunk circuit $5_b$ in FIG. 1. The circuits $5_a$ and $5_b$ connect by way of trunks $TT_a$ and $TT_b$, respectively, to the existing switching system 2. It should be noted that the trunks TT used to connect the test trunk circuits 5 to the existing switching system 2 are trunks known in the art as no-test trunks. More specifically, the connection from the test trunk circuits 5 to the existing switching system 2 employs trunks normally used by a local test desk 3 to test customer lines through the switching system 2. These trunks have the facility of connecting to a customer line irrespective of the busy or idle state of that line. More specifically, a local test desk trunk or no-test trunk, hereinafter referred to simply as test trunk, can be connected to a busy customer line by the existing switching system, unlike other incoming trunks. The importance of this aspect of the no-test trunk will become apparent in the subsequent discussion.

Figure 2:
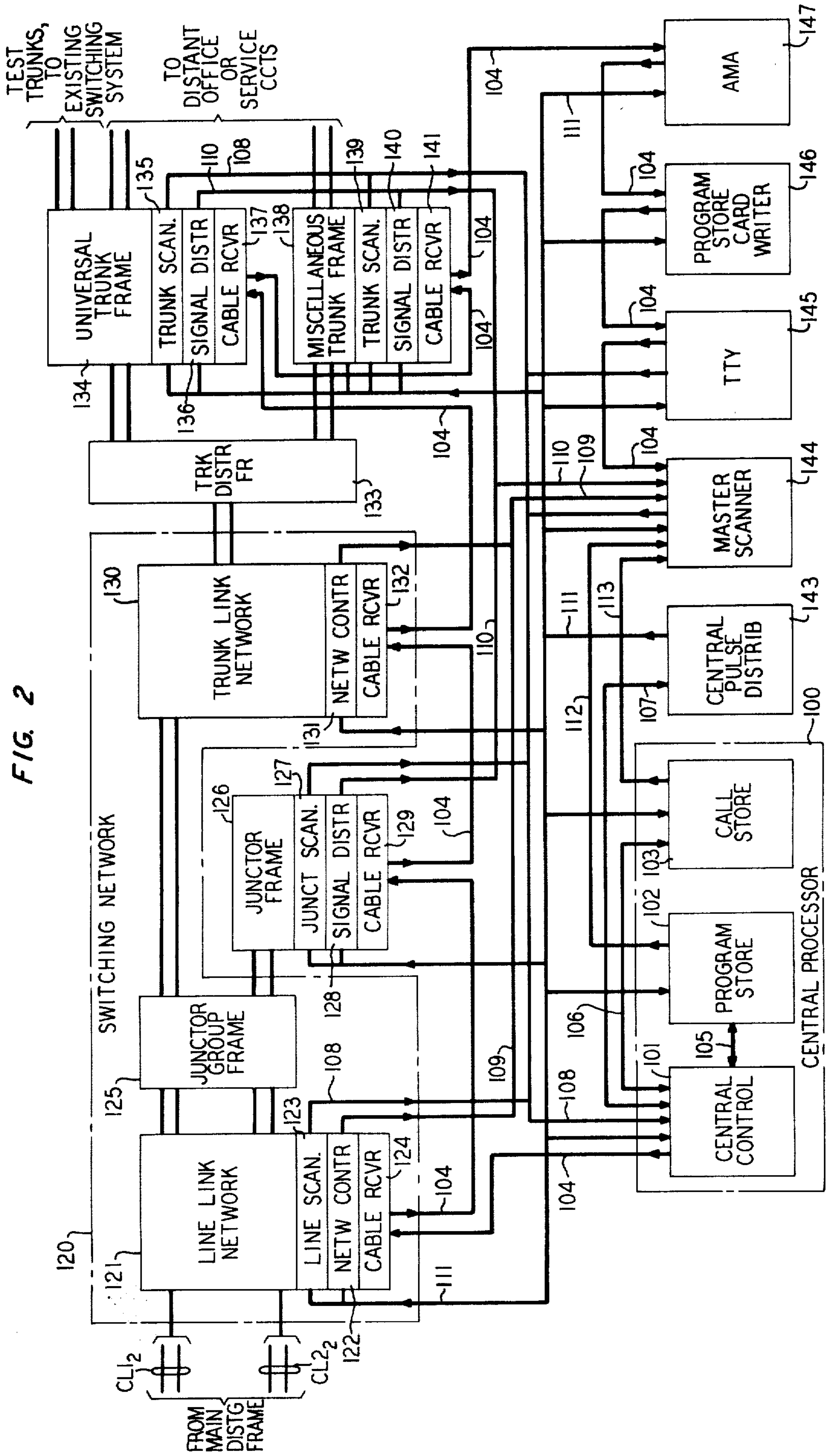
FIG. 2 shows a block diagram representation of the electronic switching system shown in FIG. 1.

In the above it was mentioned that an electronic switching system 1 is employed in this embodiment of applicants' invention. A block diagram representation of such an electronic switching system is shown in FIG. 2. It should be noted that the electronic switching system shown in FIG. 2, apart from the test trunks terminated on the universal trunk frame 134, has been completely described in R. W. Downing et al., U.S. Pat. No. 3,570,008, issued Mar. 9, 1971. The disclosure of the Downing patent is herein incorporated by reference. Additional discussion of the electronic switching system represented by the block diagram shown in FIG. 2 is presented in a collection of papers constituting the *Bell System Technical Journal*, September, 1964, entitled "No. 1 Electronic Switching System".

The test trunk circuits 5 shown in FIG. 1 are similar in their control to the trunk circuits disclosed in the aforementioned Downing patent and the trunk circuit disclosed in R. C. Casterline et al., U.S. Pat. No. 3,336,442, issued Aug. 15, 1967. They are connected in the universal trunk frame 134 (FIG. 2) as are the trunk circuits disclosed in the Downing and Casterline patents and are controlled in the fashion of known trunk circuits by signals generated with the remainder of the electronic switching system. Since, however, the Downing patent and the *Bell System Technical Journal* reference thoroughly descibe the operation of the electronic switching system (FIG. 2) and the generation of these control signals, no detailed discussion of that system will be presented here.

Turning attention to the operation of applicants' invention, to verify the proper connection of the electronic switching system 1 (FIG. 1) to the terminals $t_1$ and $t_2$ for the customer line CL1, it is necessary to make a connection by means of one of the test trunks $TT_a$ or $TT_b$ (FIG. 1) through the existing switching system 2 to the port of the existing switching system 2 assigned and connected to the customer line CL1. Substantially simultaneously, a connection is also reserved, by known methods, from the test trunk circuit 5 connected to the appropriate test trunk TT to the port on the electronic switching system 1 which is assigned and ostensibly properly connected to the customer line CL1. The connection of the test trunk circuit 5 through one of the test trunks TT to the existing switching system port for the customer line CL1 will be discussed in more detail subsequently. Suffice it to say here that once the directory number for the customer line CL1 is determined, the connection from the test trunk circuit 5 to and through the existing switching system 2 is accomplished by the electronic switching system 1 in a fashion similar to that for any outgoing trunk call. For example see the outpulsing connection of FIG. 7 of the aforementioned Downing reference.

Figure 8:
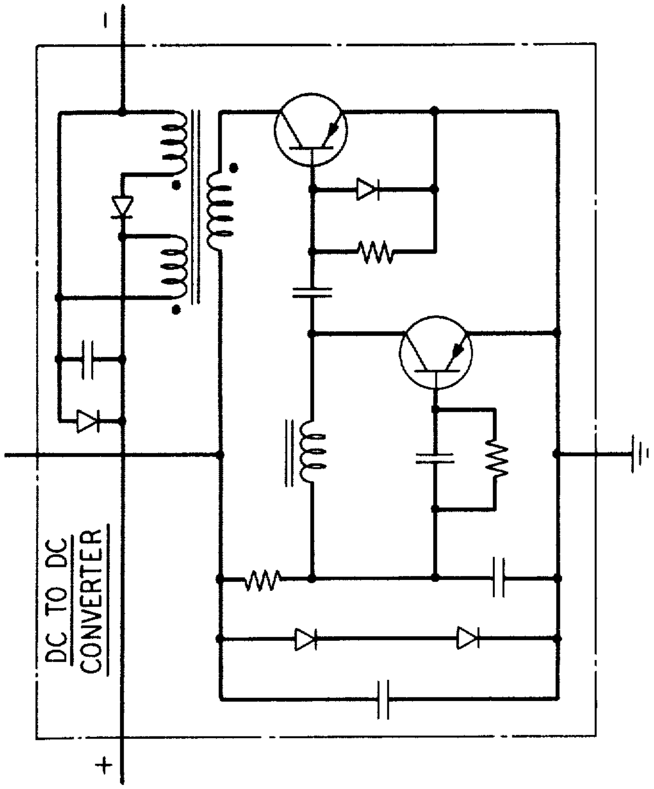
FIG. 8 shows a schematic diagram of the DC to DC converter shown in FIG. 3B.

The connection from the test trunk circuit 5 through the electronic switching system 1 is as illustrated in the talking connection shown in FIG. 8 of the aforementioned Downing reference for an incoming trunk call. As will be discussed below, the call signaling connection of FIG. 8 is not required. This is due to the fact that the directory number for the customer line is developed by a program internally stored within the program store 102 (FIG. 2) of the electronic switching system.

More specifically, instructions are stored in the program store 102 which respond to selected input information from the TTY 145 to determine the directory number of the customer line to be tested. In one phase of the operation of applicants' arrangement a message is entered by means of the TTY 145 specifying a block of contiguous directory numbers which are to be tested. In addition, information is supplied specifying which of the test trunks TT (FIG. 1) is capable of being connected by the existing switching system 2 to the respective customer lines. When the instructions stored in the program store 102 (FIG. 2) are executed, a directory number of the block of directory numbers specified by the aforementioned input information is selected together with a test trunk TT (FIG. 1) capable of being connected to the corresponding customer line by the existing switching system 2. Using program methods discussed in the aforementioned Downing patent and in the *Bell System Technical Journal* reference, a connection is established through the test trunk circuit 5 to a dial pulse or multifrequency transmitter, depending upon the type of signaling required by the existing switching system 2. In the case to be discussed in detail below, a dial pulse transmitter is connected for transmission of the appropriate directory number digits to the existing step-by-step switching system. In addition, again using program methods known in the prior art, a connection is reserved through the switching networks of the electronic switching system to the port, otherwise known as the line equipment location, assigned to the particular customer line associated with the selected directory number. When dial pulsing through the test trunk circuit 5 is complete, the connection to the dial pulse transmitter is abandoned and the reserved connection through the networks of the electronic switching system is effected. Thus, if the existing switching system has successfully connected the tip and ring of the test trunk TT to the port for the customer line associated with the selected directory number, a connection now exists from the test trunk circuit 5 through the test trunk TT and existing switching system 2 to the customer line and from the test trunk circuit 5 through the electronic switching system 1 to what is expected to be the customer line CL1. If such connections are established the test trunk circuit 5 is then employed for testing purposes.

Test Trunk Circuit

Figure 3:
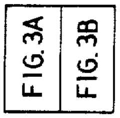
FIG. 3, including
Figure 3A:
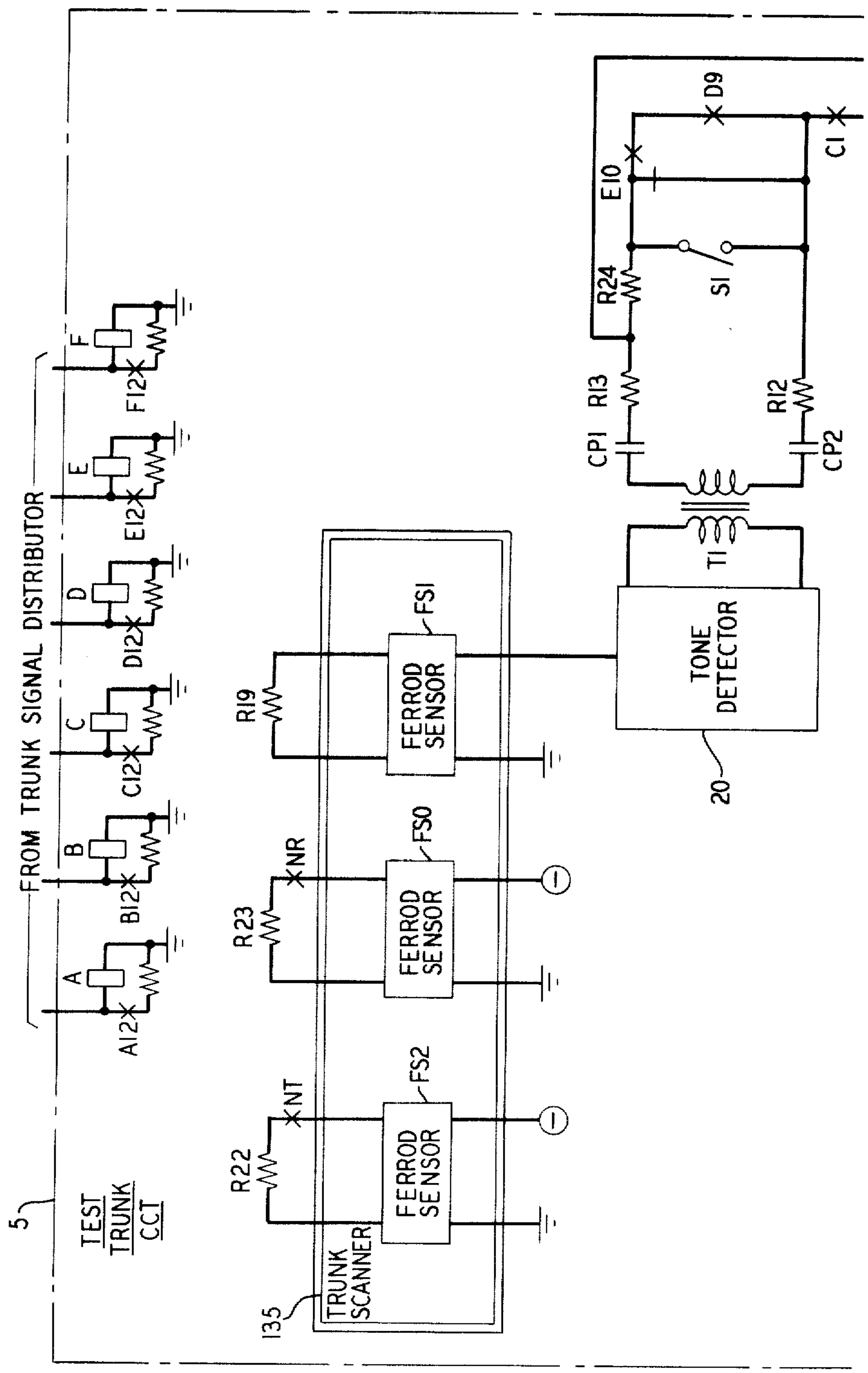
FIGS. 3A and 3B, shows a schematic diagram of the test trunk circuit shown in FIG. 1.
Figure 3B:
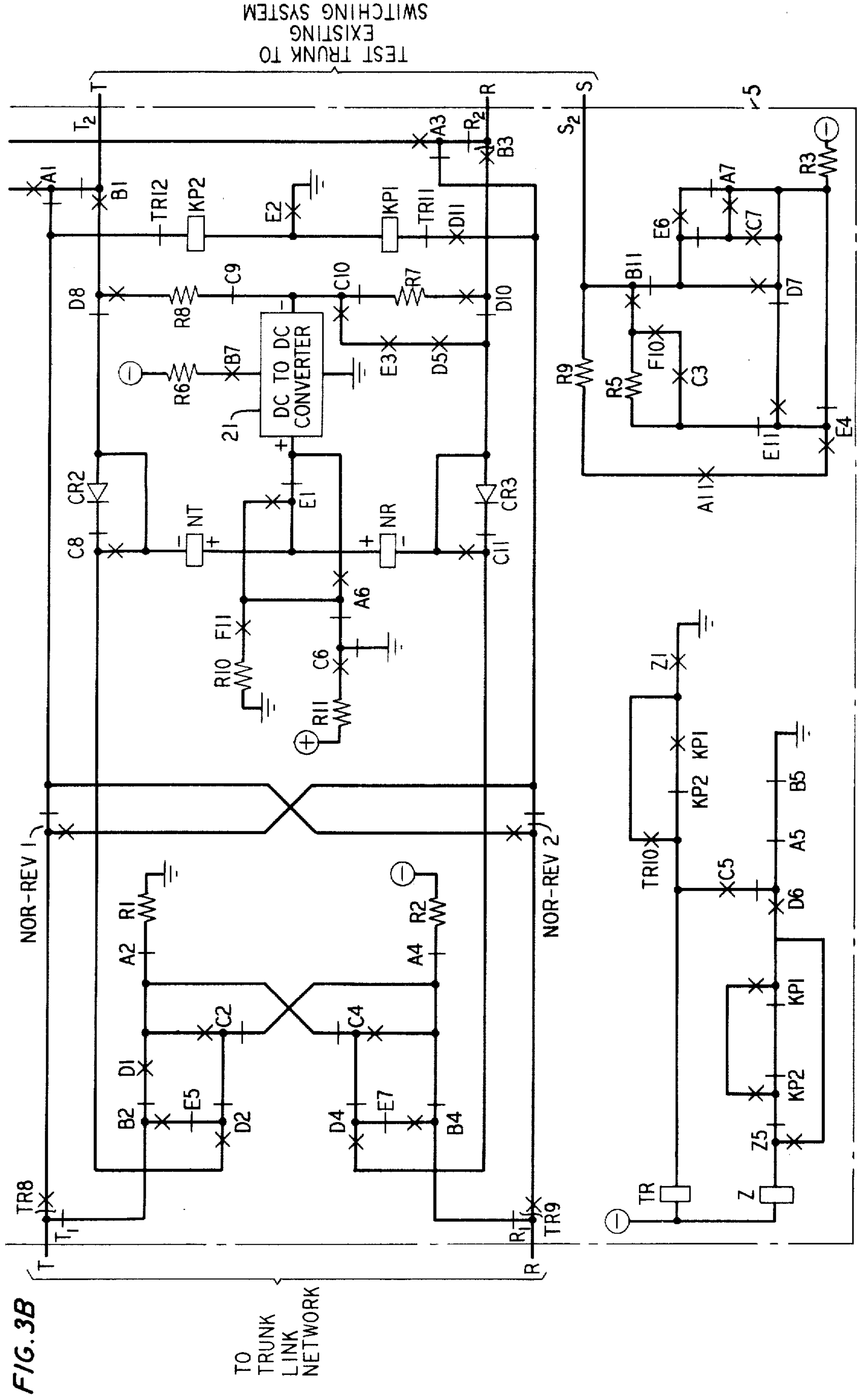

A detailed schematic diagram of the test trunk circuit 5 is shown in FIG. 3 including FIG. 3A and 3B. By way of explanation of the symbology used, a relay, such as the relay A, is represented by a rectangular symbol (FIG. 3A). Relay contacts are represented by a short line perpendicular to a connection line indicating a normally closed contact of the relay and by an X on a connection line indicating a normally open contact of the relay. By "normally" is meant the connection to be expected when the relay is nonoperated. In addition, relay contacts are designated in the drawing in a manner that indicates the relay of which the contacts are part and as well uniquely identifies the particular contacts with respect to other contacts of the same relay. For example, referring to contacts B2, shown in the upper left portion of FIG. 3B, it is noted that the B portion of the designation indicates that the particular contact or contacts are controlled by the B relay (FIG. 3A) and the 2 uniquely identifies the particular contact on the B relay with respect to other contacts of the B relay. It should be observed that in this instance the 2 designates the transfer arm of the relay and its associated normally closed and open contacts. In other instances, such as the contact C5 shown in the lower left portion of FIG. 3B, the designation 5 identifies only the transfer arm of the relay and associated normally open contacts.

It should first be noted that the electrical configuration of the test trunk circuit (FIG. 3) is controlled by the relays A through F which are connected to the trunk signal distributor 136 (FIG. 2). Each of these relays is of a latching type, responsive to a first signal to operate and latch and responsive to a second signal to unlatch. Only one of the relays A (FIG. 3) through F can be signaled to operate and latch or to unlatch at any one time. With the six relays shown, each having two functional states, it is apparent that the test trunk circuit is capable of assuming 64 operational states. In the discussion which follows each of the operational states which is useful for the purposes of this particular embodiment of the invention will be discussed. It should be noted, however, that some operational states are used in this embodiment which are not discussed. They are, however, merely transitional states employed to transition from one desired state to another and required by reason of the limitation on the signaling to the relays A through F from the signal distributor 136 (FIG. 2).

The electrical states are identified by unique numbers obtained by summing weights assigned to each relay which is operated. More specifically, the relay A (FIG. 3) is assigned the weight 1, the relay B the weight 2, the relay C the weight 4, the relay D the weight 10, the relay E the weight 20, and the relay F the weight 40. Thus, the state 7 indicates that the relays A, B, and C are operated and relays D, E, and F are nonoperated. If, when in state 7 the relay D is operated, the state 17 is assumed by the test trunk circuit 5.

State 0

In the state 0 the test trunk circuit is referred to as "idle". The relays A, B, C, D, E, and F (FIG. 3) are all nonoperated and open circuits are presented to both ports of the test trunk circuit. This is the first state employed in each sequence of tests to be described in more detail subsequently.

State 4

In this state only the C relay is operated and latched. As a result, the C5 normally open contact of the C relay is closed and a ground is supplied to the TR relay coil through the normally closed contacts D6, A5, and B5. Consequently, the TR relay operates, closing thereby a path through the TR9 and TR8 contacts of the TR relay from the $R_1$ and $T_1$ terminals, respectively, of the test trunk circuit through to the NOR-REV switch. It is important here to recall that the test trunk circuit (FIG. 3) is connected in the universal trunk frame 134 (FIG. 2) in the fashion of a trunk circuit as disclosed in the Downing patent. Thus, the $T_1$ and $R_1$ terminals of the test trunk circuits are connected to the tip (T) and ring (R) terminals of a trunk from the trunk line network 130 through the trunk distributing frame 133. The trunk from the trunk link network to the $T_1$ and $R_1$ terminals of the test trunk circuit (FIG. 3) will hereinafter be referred to as an ESS trunk.

It was above seen that as a result of the operation of the C relay the $T_1$ and $R_1$ terminals are connected, respectively, to contacts of the NOR-REV switch. The NOR-REV switch is provided for convenience in adapting the test trunk circuit to existing switching systems. For example, in the case of the illustrative step-by-step existing switching system 2 (FIG. 2) the NOR-REV switch (FIG. 3) is manually switched to connect in state 4, the $R_1$ terminal of the test trunk circuit to the $T_2$ terminal of the test trunk circuit and, similarly, to connect the $T_1$ terminal of the test trunk circuit to the $R_2$ terminal of the test trunk circuit.

Thus, upon entry into state 4 having switched the NOR-REV switch as described above, a path is connected between the $T_2$ and $R_2$ terminals and the $R_1$ and $T_1$ terminals, respectively. In addition, a negative potential is applied to the $S_2$ terminal by means of the normally closed contacts B11 and E6, the normally open contacts C7 of the operated C relay and the resistor $R_3$. In this condition a current which will hereinafter be referred to as high current, is supplied to the terminal $S_2$ when that terminal is appropriately connected to ground. In other states of the test trunk circuit additional resistors are connected in series with the resistor $R_3$ to produce a lower current which is supplied to the $S_2$ terminal. In those states the current supplied is referred to as low current. The significance of these two current levels will become apparent in the subsequent discussion of the existing switching system.

It should be here observed that the terminals $T_2$, $R_2$, and $S_2$ are connected to one of the test trunks TT (FIG. 1) which are connected to the existing switching system 2. More specifically, the $T_2$ terminal (FIG. 3B) is connected to the tip (T) of the test trunk, the terminal $R_2$ is connected to the ring (R) of the test trunk, and the terminal $S_2$ is connected to the sleeve (S) of the test trunk.

It should be noted that in the state 4 the electronic switching system 1 (FIG. 1) connects a dial pulse transmitter to the ESS trunk connected to the test trunk circuit (FIG. 3), as disclosed in the Downing patent. In addition, outpulsing of the digits of the selected customer line directory number which are required for a connection through the existing switching system 2 (FIG. 1) is accomplished. While the dial pulse transmitter is known in the prior art and discussed in the cited references, selected aspects of the operation of a simplified version of a dial pulse transmitter are presented for convenience.

Figure 7:
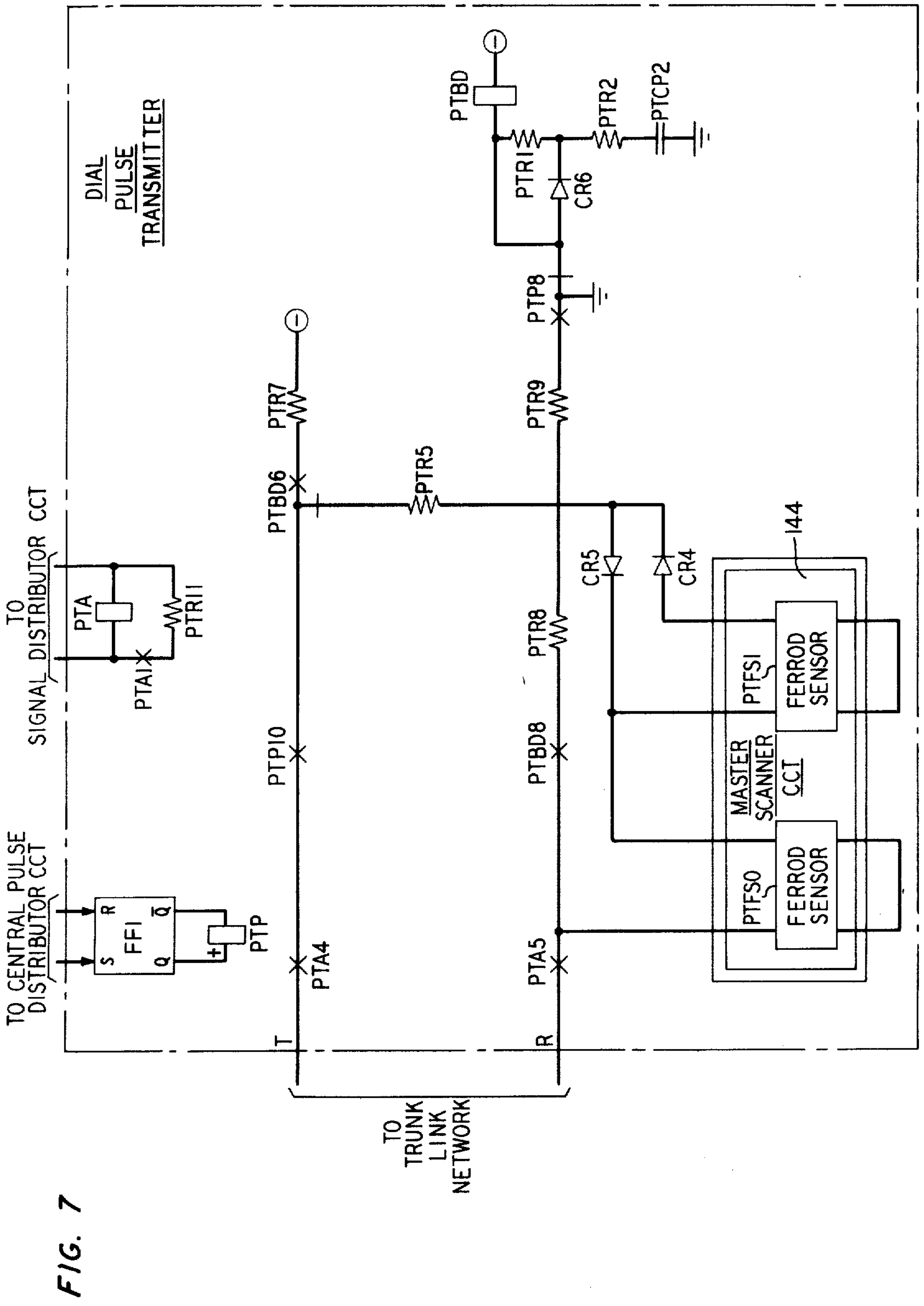
FIG. 7 shows a schematic diagram of a dial pulse transmitter for use in the electronic switching system shown in FIG. 2.

A schematic diagram representation of a dial pulse transmitter known in the prior art and suitable for use in the illustrative embodiment of applicants' invention is shown in FIG. 7. It can be therein that a latching relay of the type previously described is included in the dial pulse transmitter and connected to the signal distributor circuit 136 (FIG. 2). In addition, a flip-flop FF1 (FIG. 7) is provided and connected to the central pulse distributor circuit 143 (FIG. 2). The relay PTA (FIG. 7) and the flip-flop FF1 control the operation of the dial pulse transmitter.

More specifically, when the dial pulse transmitter is to be connected through the trunk link network 130 to an outgoing trunk such as the previously mentioned ESS trunk, the flip-flop FF1 is as previously described in the Downing and *Bell System Technical Journal* references placed in the set state by signals from the central pulse distributor circuit 143. This results in the flip-flop PTP being operated. Thereafter, the relay PTA is operated by signals from the signal distributor 140. As a result, a loop is created between the T and R terminals of the dial pulse transmitter (FIG. 7) through the resistor PTR5. The ferrod sensors PTFS0 and PTFS1 in the master scanner circuiti 144 are also connected in the loop through the diodes CR5 and CR4, respectively. Thus, if battery is applied to the R terminal of the dial pulse transmitter (FIG. 7) and ground to the T terminal of the dial pulse transmitter current flows through the resistor PTR5, the diode CR5, and the ferrod sensor PTFS0. When the master scanner circuit 144 (FIG. 1) scans the ferrod sensor PTFS0 and the ferrod sensor PTFS1, it detects the current flow through the ferrod sensor PTFSO and the absence of current flow through the sensor PTSF1. This is used by the central control as an indication that dial pulsing may begin.

When a dial pulse is to be transmitted, the flip-flop FF1 (FIG. 7) is reset causing the relay PTP to become nonoperated. When the relay PTP reaches its nonoperated state, the relay PTBD operates by reason of the ground applied through the PTP8 contacts. As a result the bridge between the T and R terminals is removed and an open circuit is presented to the T terminal. After a standard dial pulse interval, the flip-flop FF1 is returned to the set state by signals from the central pulse distributor 143 (FIG. 2) thereby terminating the dial pulse. It should be noted, however, that the relay PTBD (FIG. 7) does not immediately become nonoperated even though the ground connection to its coil through the PTP8 contacts has been removed. More specifically, the relay PTBD remains operated for an interval of time determined by the resistors PTR1, PTR2, and a capacitor PTPC2. During this interval battery is connected through the resistors PTR6 and PTR7 to the T terminal of the dial pulse transmitter (FIG. 7) and ground is connected through the PTP8 contacts and the resistor PTR8 to the R terminal of the dial pulse transmitter. This configuration then forms the basis for dial pulsing with a pulse being transmitted during the interval when flip-flop FF1 is reset.

More specifically, if during the interval when the PTBD relay is maintained operated by the previously mentioned resistor capacitor network, the flip-flop FF1 is reset, a pulse is transmitted on the T and R terminals of the dial pulse transmitter by virtue of the open circuit between the T and R terminals and battery and ground, respectively, resulting from the opening of the PTP10 and PTP8 contacts. The setting of the flip-flop FF1 and the resulting closing of the PTP10 and PTP8 contacts terminates the pulse. In addition, it should be noted that the time interval over which the PTBD relay remains operated is somewhat greater than the standard interpulse time for a dial pulse transmitter, but it is less than the interdigital time for a dial pulse transmitter. Thus, when a complete digit has been transmitted and the time interval since the last operation of the PTP relay exceeds the interpulse time, the PTBD relay becomes nonoperated. As a result, the aforementioned loop through the PTR5 resistor is reconnected to the T and R terminals of the dial pulse transmitter.

It is here important to note that if during an interdigital time battery should appear on the T terminal of the dial pulse transmitter (FIG. 7) and ground on the R terminal, which condition is referred to in the prior art as a "reverse battery", current flows through the aforementioned loop comprising the bridging resistor PTPR5 as described previously with one exception. Current not only flows through the ferrod sensor PTFS0 but also flows through ferrod sensor PTFS1 of the master scanner circuit 144 (FIG. 2). The master scanner circuit 144 scans the aforementioned ferrod sensors during each such interdigital time. Detection of current flow through both ferrod sensors is interpreted by the central control 101 (FIG. 2) as indicating that the destination circuit for the dial pulse signals has indicated a busy condition. As a result, dial pulse transmission is terminated. This priorly known feature of the dial pulse transmitter (FIG. 7) is useful in conjunction with tests performed by the test trunk circuit 5 (FIG. 3).

Moreover, it will be recalled that dial pulse transmission occurs while the test trunk circuit 5 (FIG. 3) is in the state 4. Thus, when operating with existing switching system 2 (FIG. 1) of the step-by-step type, which, when busy, returns reverse battery to the dial pulse transmitter, it is possible that dial pulsing will be terminated by central control 101 (FIG. 2) before that dial pushing is complete. As indicated above, the significance of this termination on the basis of a busy condition in the existing switching system will be discussed below. However, it is important to note that the busy condition here mentioned is not a busy condition on the customer line corresponding to the digits being transmitted by the dial pulse transmitter, but rather, is a busy condition in the circuitry in the existing switching machine 2 (FIG. 1) which prevents it from connecting to the desired customer line.

States 5, 15, and 35

In the state 5 the C relay and A relay (FIG. 3) are both operated and latched. As a result, a high current through the resistor R3 is applied to the S2 terminal of the test trunk circuit. In addition, the previously mentioned TR relay is nonoperated since the normally closed A5 contact is now open and no other path to ground for the TR relay coil is provided. Thus, no connection of the $R_1$ terminal to the $T_2$ terminal and the $T_1$ to the $R_2$ terminal exists as in state 4. Moreover, the $T_1$ and $R_1$ terminals are open circuited permitting the electronic switching system (FIG. 2) to disconnect any previously connected service circuits such as a dial pulse transmitter (FIG. 7) and to connect a path through the switching network 120 (FIG. 2) to the expected port for the selected customer line.

The $T_2$ terminal is connected through the A1 and C1 contacts and the $R_2$ terminal is connected through the A3 contacts to the resistor R24 which acts as a holding bridge for the existing switching system 2 (FIG. 1). This will be discussed in more detail in conjunction with the existing switching system 2 (FIG. 1). The states 15 and 35 produce the same connections of the terminal of the test trunk circuit as does state 5.

State 25

State 25 is provided for use with an existing switching system 2 (FIG. 1) which provides a tone to indicate when, by reason of a busy equipment condition, it is unable to connect to the desired customer line. In the assumed existing switching system 2 (FIG. 1) in the illustrative embodiment which is a step-by-step system, no such tone is provided, but rather the aforementioned reverse battery is supplied by the switching system during dial pulsing to indicate busy. Nevertheless, for complete disclosure state 25 is here discussed.

In state 25 the A, C, and E relays are operated and latched. In this state the current supplied to the $S_2$ terminal of the test trunk circuit is the aforementioned low current since the resistor R9 is connected in series with the resistor R3. The significance of low current on the $S_2$ lead will be discussed in connection with the existing switching system 2 (FIG. 1).

As in the state 5, the $T_1$ and $R_1$ terminals are open circuited. The $T_2$ and $R_2$ terminals, however, are connected, respectively, to the R12 and R13 resistors. It should be noted here that the switch S1 is operated only if the existing switching system 2 (FIG. 1) is a step-by-step switching system. Again, assuming for discussion of this state that the system 2 is not step by step, the signals appearing on the $T_2$ and $R_2$ terminals are applied through the resistors R12 and R13 and the capacitors CP2 and CP1, respectively, to the transformer T1 and, thus, the tone detector 20. If the tone detector 20 detects a tone from the existing switching system 2 (FIG. 1), a current is generated through the ferrod sensor FS1 of the trunk scanner 135. This is interpreted by the central control 101 as indicating that the existing switching system is unable to complete the desired connection and testing of the selected customer line is terminated.

State 7

In state 7 the A, B, and C relays are operated and latched. As a result, the resistor R5 is placed in series with resistor R3 and connected to the terminal $S_2$, thereby supplying the aforementioned low current to the $S_2$ terminal when the $S_2$ terminal is appropriately connected to ground. As in states 5 and 25 the $R_1$ and $T_1$ terminals are open circuited. The $R_2$ terminal is connected to the − side of the polar relay NR and the $T_2$ terminal is connected to the − side of the polar relay NT. Thus, if battery and ground are connected respectively to the $T_2$ terminal and the $R_2$ terminal or, conversely, to the $R_2$ terminal and the $T_2$ terminal, one of the polar relays NT and NR operates. In this state, operation of either of the relays, NT and NR, indicates to the central control 101 (FIG. 2) that the customer line to which the existing switching system 2 (FIG. 1) is connected is in a busy state. More specifically, it indicates that talking battery has been detected on the connected customer line. This information is employed in the central control 101 (FIG. 2) as will be discussed below to determine the subsequent appropriate sequence of tests.

The central control 101 is apprised of the state of the NT and NR relays by virtue of the ferrod sensors FS2 and FS0, respectively, in the trunk scanner 135. The trunk scanner 135 determines the state of these sensors, in a manner disclosed in the references, prior to the transistion of the test trunk circuit from the state 7 to another state.

State 17

In the state 17 the A, B, C, and D relays are operated and latched. As is the case in state 7 the R5 resistor is connected in series with the R3 resistor and connected to the terminal $S_2$ supplying thereto the aforementioned low current. The $R_2$ and $T_2$ terminals are open circuited. The $R_1$and $T_1$ terminals are respectively connected to the − terminal of the polar relay NR and to the − terminal of the polar relay NT. As a result, if battery potential is connected to the $T_1$ terminal and ground to $R_1$ terminal, or vice versa, one of the relays NT and NR operates. Operation of either of these relays is reflected by the ferrod sensors FS2 and FS0, respectively, and indicates that the customer line to which the electronic switching system 1 (FIG. 1) is connected is busy or that there is an erroneous connection to a line circuit. This indication is used by the central control 101 (FIG. 2) to determine the appropriate subsequent sequence of tests.

State 6

In state 6 the B and C relays (FIG. 3) are operated and latched. As a result the R5 resistor is connected in series with the R3 resistor and connected to the terminal $S_2$, supplying thereto the aforementioned low current. In addition, the $R_2$ terminal is connected to the − terminal of the polar relay NR and the $T_2$ terminal is connected to the − terminal of the polar relay NT. Finally, the $T_1$ terminal is connected through the resistor R1 to ground and the $R_1$ terminal is connected through the resistor R2 to battery.

The aforementioned connections are effected only in the case in which the tests conducted in states 7 and 17 indicate that each of the switching systems is not connected to a busy customer line. The battery potential applied to the terminal $R_1$ is connected to the ring (R) terminal of the ESS trunk and through the switching network 120 (FIG. 2) to the expected termination port on the line link network 121 for the selected customer line. Similarly, the ground connected through resistor R1 (FIG. 3) to the terminal $T_1$ is connected to the tip (T) terminal of the ESS trunk and through the switching network to the expected port on the line link network 121 for the selected customer line. The $R_2$ (FIG. 3) terminal which is connected to the − terminal of the NR relay in the test trunk circuit is also connected by means of the ring (R) terminal of the test trunk to the existing switching system 2 (FIG. 1) and through the existing switching system 2 to the port of the existing switching system 2 for the selected customer line. In similar fashion the $T_2$ terminal (FIG. 3) which is connected to the − terminal of the NT relay in the test trunk circuit is also connected by means of the tip (T) terminal of the test trunk to the existing switching system 2 (FIG. 1) and through the existing switching system 2 to the port for the selected customer line in the existing switching system 2 (FIG. 1). If the connections from the respective ports of the two switching systems to the main distributing frame 4 are correctly executed and the connections on the main distributing frame 4 are correct, the NR relay operates. If the tip and ring terminals have been reversed anywhere in the path, the NT relay operates. The operation of these two relays is indicated by means of the previously discussed ferrod sensors FS2 and FS0 in the trunk scanner 135 to the central control 101 (FIG. 2).

State 2

In this state only the B (FIG. 3) relay is operated and latched. As a result, the resistor R5 is connected in series with the resistor R3 and connected to the terminal $S_2$ thereby supplying the aforementioned low current. In addition, the $R_1$ terminal is connected through the R1 resistor to ground. The $T_1$ terminal is connected through the R2 resistor to battery. Also, the $R_2$ terminal is connected to the − terminal of the NR relay and the $T_2$ terminal is connected to the − terminal of the NT relay. If a proper connection, as discussed in connection with the discussion of the state 6, is effected the NT relay operates. If the tip and ring has been transposed at any point in the network, the NR relay operates. The operation of these relays indicated by the ferrod sensors FS2 and FS0 in the trunk scanner 135 (FIG. 2) is used by the central control 101 to determine the appropriate subsequent sequence of tests.

State 3

In this state the A and B (FIG. 3) relays are operated and latched. The R5 resistor is connected in series with the R3 resistor and connected to the terminal $S_2$, thereby supplying the aforementioned low current. In addition, the $R_2$ terminal is connected to the − terminal of the NR relay and the $T_2$ terminal is connected to the − terminal of the NT relay. Finally, the $T_1$ and $R_1$ terminals are open circuited.

In this state the central control 101 (FIG. 2) causes the line ferrod for the selected customer line to be reconnected to that line. If the line ferrod is arranged for loop start, one of the relays NT and NR operates; otherwise no relay operates. The state of the NT and NR relays is reflected as previously indicated by the ferrod sensors FS2 and FS0 in the trunk scanner 135 (FIG. 2).

States 1 and 11

In the state 1 only the A (FIG. 3) relay is operated and latched. As a result high current is supplied through the R3 resistor to the $S_2$ terminal of the test trunk circuit (FIG. 3). In addition, the $R_2$ and $T_2$ terminals and the $R_1$ and $T_1$ terminals are open circuited. No test is conducted in this state.

The same results with respect to the terminal connections of the test trunk circuit obtain for the state 11.

State 13

In this state the A, B, and D relays are operated and latched. The R5 resistor is connected in series with the R3 resistor and to the $S_2$ terminal, thereby supplying the aforementioned low current. In addition, the $R_1$ terminal is connected through the CR3 diode to the − terminal of the NR relay and the $T_1$ terminal is connected through the CR2 diode to the − terminal of the NT relay. Also, the $R_2$ terminal is connected through the resistor R7 to the − terminal of the DC to DC converter 21 and the $T_2$ terminal is connected through the resistor R8 to the − terminal of the converter 21. It should be noted that the positive terminal of the converter 21 is connected to the + terminals of the NT and NR relays.

It can be seen from the above connections that a simplex signal is supplied by the DC to DC converter 21 to the $T_1$ and $R_1$ terminals and the $T_2$ and $R_2$ terminals. This state is assumed if it is determined that the customer line appears to be busy. If a proper connection is effected throughout by both switching systems and on the main distributing frame 4 (FIG. 1), both of the NT and NR relays operate. If only one side is correct, for example, the ring side, only the NR relay operates. Operation of the NR and NT relays is indicated by the ferrod sensors FS2 and FS0 as above described to the central control 101 (FIG. 1) by means of the trunk scanner 135.

It should be noted that while a DC to DC converter 21 (FIG. 3) to generate a DC potential between the + and − terminals of the converter 21 and relays appropriate to the detection of DC potentials of selected polarity have been shown herein, an AC potential generator could be used, with appropriate modification of the detection means. In addition, as another alternative to the DC to DC converter 21 shown in FIG. 3, an audio frequency choke could be bridged across the $T_2$ and $R_2$ terminals. Since talking battery and ground are supplied to the customer line through substantially equal impedances, the $T_2$ and $R_2$ terminals and, as a result, the tip and ring of the customer line connected through the existing switching system 2 (FIG. 1) to the $T_2$ and $R_2$ terminals (FIG. 3) both tend toward a DC potential, half that of the battery potential. This change in DC potential on the tip and ring of the customer line should appear at the $T_1$ and $R_1$ terminals, respectively, of the test trunk circuit and may be detected using known comparators with appropriately selected reference voltages.

In addition, DC to DC converters of the type shown in FIG. 3 are well known in the prior art. One suitable for use in applicants' invention is shown in detail in FIG. 8.

State 43

In this state the A, B, and F relays are operated and latched. The R5 resistor is connected in series with the R3 resistor and connected to the $S_2$ terminal thereby supplying the aforementioned low current. In addition, the $R_2$terminal is connected to the − terminal of the NR relay and the $T_2$ terminal is connected to the − terminal of the NT relay. Also ground is supplied through the resistor R10 to the + terminals of the NT and NR relays. Finally, the $R_1$ and $T_1$ terminals are open circuited.

While the test trunk circuit is in this state, the electronic switching system central control 101 (FIG. 2) connects the appropriate line ferrod, as described in the Downing patent, to the selected customer line. In addition, it should be noted that in this state, if battery is supplied to either the $T_2$ or the $R_2$ terminals, the corresponding NT and NR relay, respectively, operates.

Thus, if the line ferrod is a ground start ferrod, the NR relay operates. The respective states of the relays, NT and NR, are indicated previously discussed by the ferrod sensors FS2 and FSO in the trunk scanner 135 to the central control 101 (FIG. 2).

State 56

In this state the B, C, D, and F relays are operated and latched. As a result the R3 resistor is connected to the $S_2$ terminal thereby supplying the aforementioned high current. In addition the $R_1$ terminal is connected to the − terminal of the NR relay and the $T_1$ terminal is connected to the − terminal of the NT relay. Finally, the $T_2$ and $R_2$ terminals are open circuited.

In this state the high current on the $S_2$ terminal which is connected through the sleeve lead of the test trunk to the existing switching system is used to signal the existing switching system 2 (FIG. 1) to reconnect the appropriate line relay to the selected customer line. If the line relay is in a loop start configuration the NR relay operates. If the line relay is in a ground start configuration, neither relay operates. The operation of the NT or NR relay is indicated to the central control 101 (FIG. 2) through the trunk scanner 135.

State 57

In this state the A, B, C, D, and F (FIG. 3) relays are operated and latched. As a result the R3 resistor is connected to the $S_2$ terminal, thereby supplying the aforementioned high current. In addition, the $R_1$ terminal is connected to the − terminal of the NR relay and the $T_1$ terminal is connected to the − terminal of the NT relay. Finally, the $T_2$ and $R_2$ terminals are open circuited. It should also be noted that ground is supplied through the resistor R10 to the positive terminals of the NT and NR relays.

The high current on the $S_2$ terminal is used to signal the existing switching system 2 (FIG. 1) to reconnect the appropriate line relay to the selected customer line. If that relay is configured for ground start operation, the NR relay (FIG. 3) operates. The operation of the NR relay is indicated to the central control 101 (FIG. 2) by the trunk scanner 135.

The above has described the states of the test trunk circuit 5 (FIG. 3) which are employed in testing an existing switching system of the step-by-step type. It will be apparent to those skilled in the art upon reading this disclosure that the test trunk circuit herein described is by no means limited to the testing of step-by-step switching systems and no such limitation is to be inferred from this disclosure. In addition, it is also to be noted that states other than the states described above are possible for the test trunk circuit 5 (FIG. 3). Such other states are useful in testing other types of existing switching systems 2 (FIG. 1).

Figure 4:
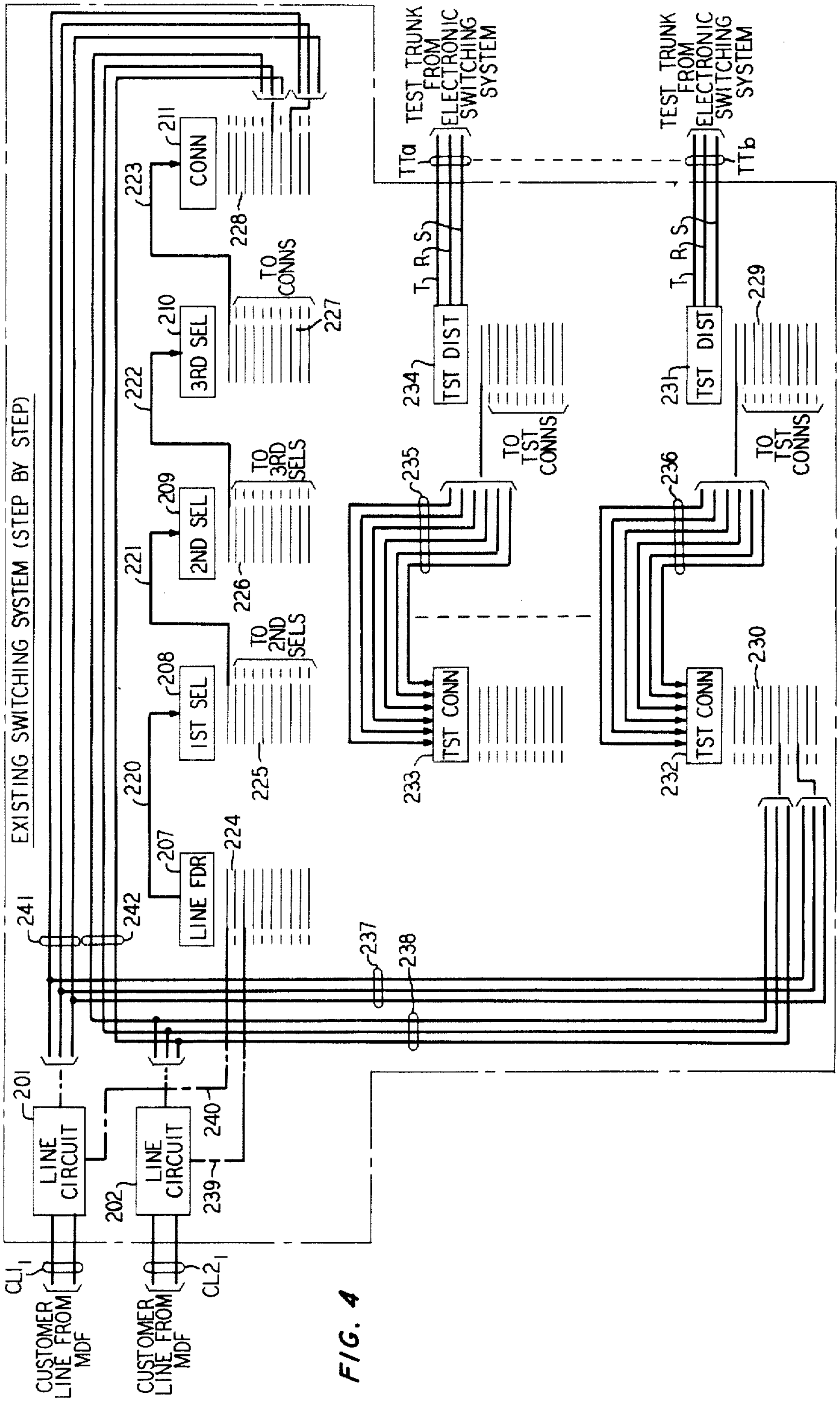
FIG. 4 shows a block diagram representation of the existing switching system shown in FIG. 1 wherein the switching system is a step-by-step system.

Having now described the states of the test trunk circuit (FIG. 3) which are used in conjunction with line verification in the illustrative embodiment, attention is turned to a brief description of the existing switching system shown in FIG. 4.

Existing Switching System (Step-by-Step)

A switching system employing step-by-step technology is shown in FIG. 4. Such systems are well known in the art and require no disclosure here except with respect to the test facilities provided in the switching system which are required for use with applicants' invention. Moreover, since the test facilities are known in the prior art, only a discussion of features useful to the invention is presented.

More specifically, it can be seen in FIG. 4 that a plurality of test distributors 231 and 234 and test connectors 232 and 233 are provided in addition to the well-known line finder 207, selectors 208, 209, 210, and connector 211. It should be noted that the test connector 232 is connected in the same fashion as the connector 211 to the lines 241 and 242 from the line circuits 201 and 202, respectively, which are connected to the lines $CL1_1$ and $CL2_1$. The test connector 232 is connected by lines 236 to the test distributor 231 which, in turn, is connected to the test trunk $TT_b$.

Test Distributor

Figure 5A:
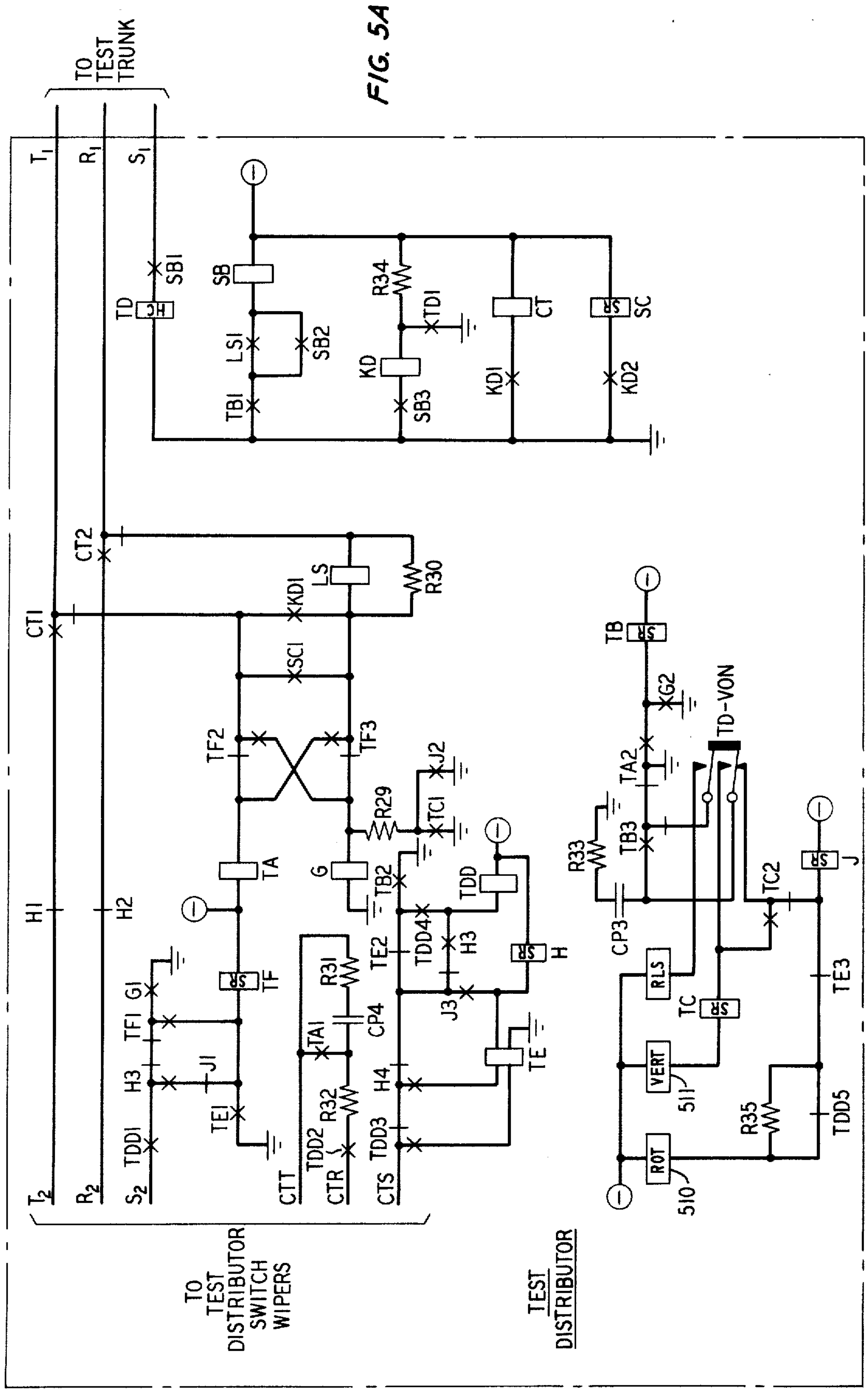
FIG. 5A shows a schematic diagram of the test distributor shown in FIG. 4.

A representation of the control circuitry for a test distributor is shown in FIG. 5A. In general, the test distributor acts in response to dial pulses received on the $T_1$ and $R_1$ terminals from the test trunk in the fashion of a connector known in the prior art. More specifically, the switch of the test distributor responds to pulses making up a first digit by vertically stepping a number of positions corresponding to the number of pulses received. Following a minimum interdigital time the switch of the test distributor responds to the pulses making up a second digit by rotating its wipers a number of positions equal to the number of pulses received. It should be noted, however, that unlike a connector of the type generally used in customer line switching, the wipers and corresponding static elements include a minimum of six contact points for each connection position. More specifically, contact points for the $T_2$, $R_2$, and $S_2$ terminals are provided together with contact points for the CTT, CTR, and CTS terminals. It is the signals appearing on these terminals which are connected through the test distributor switch to the lines 236 and thus to the test connector 232.

It will be recalled that in the state 4 of the test trunk circuit 5 (FIG. 3) the $S_2$ terminal is supplied high current and a dial pulse transmitter such as described in FIG. 7 is connected to the tip (T) and ring (R) of the ESS trunk and through the test trunk circuit 5 (FIG. 3) to the ring (R) and tip (T) of the test trunk TT (FIG. 1). It will also be recalled that the dial pulse transmitter initially connects a resistance bridge across its T and R terminals. This resistance bridge across the T and R terminals of the dial pulse transmitter (FIG. 7) is reflected through the connections of the test trunk circuit 5 (FIG. 3) and the test trunk TT (FIG. 1) to the $R_1$ and $T_1$ terminals of the test distributor (FIG. 5A). It can be seen in FIG. 5A that when a bridge is connected between the $T_1$ and $R_1$ terminals, the TA, LS, and the G relays operate. In response to the operation of the G relay, the TB relay also operates. It should be noted that the TB relay bears the designation SR indicating that it is a slow release relay requiring a release time greater than that of the other relays employed in the test distributor. In response to the operation of the TB relay and the LS relay, the SB relay operates. As a result, a high sleeve current received on the $S_1$ terminal from the test trunk is applied to the TD relay. It should be noted that the TD relay is marked with the designation HC indicating that it is a high current relay, requiring the current before described as high current to operate. The above mentioned low current is insufficient to operate the TD relay.

Figure 5B:
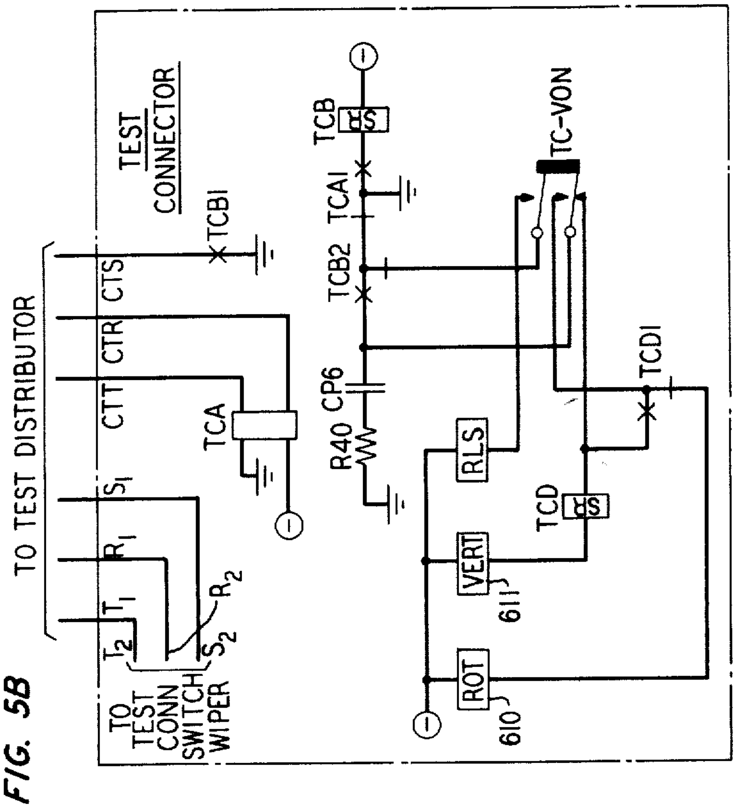
FIG. 5B shows a schematic diagram of the test connector shown in FIG. 4.

When the PTP relay (FIG. 7) in the dial pulse transmitter becomes nonoperated in response to a command from the central pulse distributor circuit 143 (FIG. 2), the PTBD relay in the dial pulse transmitter (FIG. 7) operates, removing the resistance bridge between the T and R terminals of the dial pulse transmitter. As a result, the TA, G, and LS relays (FIG. 5) all become nonoperated. However, since the TB relay is a slow release relay, it remains operated for a selected interval of time. As a result, the SB relay also remains operated. As a further result, as long as the current supplied to the $S_1$ terminal of the test distributor is high current, the TD relay remains operated.

In response to the TA (FIG. 5A) relay becoming nonoperated and the TB relay remaining operated, the TC relay operates and the vertical magnet 511 of the test distributor switch is energized to step the wipers of the test distributor switch vertically one step. Consequently, the TD-VON switch, which is the test distributor-vertical-off-normal switch operates. This operation is similar to that for any connector.

When the PTP relay (FIG. 7) is operated again, it will be recalled that PTBD remains operated for a selected interval. As a result, battery is connected to the T terminal of the dial pulse transmitter (FIG. 7) and through the test trunk circuit (FIG. 3) to the $R_1$ terminal of the test distributor (FIG. 5A). As a result, the LS and G relays operate. In addition, it should be noted that ground is connected to the R terminal of the dial pulse transmitter (FIG. 7) and through the test trunk circuit (FIG. 3) is applied to the $T_1$ terminal of the test distributor (FIG. 5). As a result, the TA relay operates.

If the PTP relay in the dial pulse transmitter (FIG. 7) becomes nonoperated within a selected interval of time, previously referred to as the interpulse time, the battery and ground connections to the T and R terminals of the dial pulse transmitter (FIG. 7) are interrupted. As a result, the G, LS, and TA relays all become nonoperated. Again, however, the TB relay remains operated for a selected interval of time greater than the pulse duration. In addition, it should be noted that the TC relay bears the designation SR and is a slow release relay. As a result, it remains operated throughout the interval between pulses. Thus, the vertical magnet of the test distributor switch is again provided with a path to ground through the now operated TD-VON switch, the contacts TB3 of the operated TB relay, and the contacts TA2 of the nonoperated TA relay. Therefore, the test distributor switch is vertically stepped one more step.

This process continues each time the PTP relay (FIG. 7) becomes nonoperated until the time between pulses produced by the nonoperation of the PTP relay is greater than the interpulse time and, in fact, is equal to the time interval referred to as the interdigital time. When the interdigital time has elapsed since the last pulse, the TC relay becomes nonoperated while the TA, G, and LS relays are operated. As a result the subsequent nonoperation of the TA relay in response to a received pulse results in the operation of the J relay by application of ground to the J relay coil through the TC2 contacts of the nonoperated TC relay and the TB contacts of the nonoperated TB relay. In addition, the rotary magnet 510 is energized by the application of ground to its coil through the resistor R35, the TE contacts of the nonoperated TE relay, and the path above recited through which ground is applied to the coil of the J relay. In response to the operation of the rotary magnet 510, the test distributor wiper steps horizontally one position.

As a result of the operation of the J relay the H relay is operated by ground applied through the J3 contacts of the J relay and the TE2 contacts of the nonoperated TE relay and finally through the TB2 contacts of the nonoperated TB relay. It should be noted that both the H and J relays are slow release relays.

With the occurrence of subsequent pulses from the pulse transmitter (FIG. 7) as reflected by the operation of the TA relay, the rotary magnet 510 is stepped horizontally a number of positions equal to the number of pulses received. When, however, the time between pulses is equal to the interdigital time, the J relay becomes nonoperated. It is at this point that the test distributor wipers have reached the connection to the desired test connector. Since the J relay is nonoperated, ground is applied through the H3 contacts of the operated H relay and the J3 contacts of the nonoperated J relay, and through the TE2 contacts of the nonoperated TE relay and the TB2 contacts of the operated TB relay to the coil of the TDD relay. Consequently, the TDD relay operates.

Following operation of the TDD relay the resistor R32 is bridged across the terminals CTT and CTR to the test distributor switch wiper. Each subsequently received dial pulse is indicated to the test connector (FIG. 5B) by the opening of the TA1 (FIG. 5A) contacts of the TA relay and the breaking of the bridge between the CTT and CTR terminals. As will be seen subsequently these pulses are used by the test connector (FIG. 5B) to step the test connector switch to the appropriate connection for the desired customer line. It should be noted that after a selected interval the H relay becomes nonoperated and as a result, as long as the G relay is operated, a ground is supplied through the G1 contacts of that relay and the TF1 and H3 contacts of the TF and H relays, respectively, and through the TDD1 contacts of the operated TDD relay to the S terminal connected to the test distributor switch wipers. As will be seen subsequently this ground is used to operate a relay, referred to as the cut-off relay, in the line circuit (FIG. 6A or FIG. 6B) of the existing switching system 2 (FIG. 1) for the desired customer line.

In the above discussion it was observed that the TDD relay (FIG. 5A) operates subsequent to the reception of two complete digits from the dial pulse transmitter. However, it should be noted that had the selected test connector been busy as indicated by a ground supplied to the CTS terminal of the test distributor prior to the operation of the TDD relay, the TE relay would have operated. As a result, the TF relay would have operated as well, thereby supplying to the dial pulse transmitter through the TF2 and TF3 contacts of the TF relay the aforementioned reverse battery indicating the connection equipment in the existing switching system 2 (FIG. 1) is busy. As was mentioned in the discussion of the dial pulse transmitter, the return of reverse battery to the dial pulse transmitter (FIG. 7) results in the termination of dial pulsing by the dial pulse transmitter.

The test connector (FIG. 5B) will be discussed briefly. The operation of the vertical magnet 611 and rotary magnet 610 in response to dial pulses, indicated by the nonoperation of the TCA relay, is similar to that of the corresponding magnets in the test distributor.

Thus, when two complete digits from the dial pulse transmitter (FIG. 7) have been received, the test connector switch wiper has been moved to the appropriate connection for the desired customer line and the $T_2$, $R_2$, and $S_2$ terminals of the test connector are connected to the line circuit for that line.

When the test distributor and test connector switches have been stepped to the desired positions for the selected customer line and subsequently the aforementioned low current is supplied through the test trunk TT (FIG. 1) to the $S_1$ terminal (FIG. 5A) of the test distributor, the TD relay becomes nonoperated. As a result, the KD relay operates, followed by operation of the SC relay and the CT relay. Operation of the CT relay cuts through the $T_1$ and $R_1$ terminals of the test distributor to the $T_2$ and $R_2$ terminals of the test distributor, thereby connecting the tip and ring of the test trunk to the tip and ring terminals of the line circuit, to be discussed below. In addition, operation of the KD and SC relays places a bridge on the lines which before the operation of the CT relay were connected to the $T_1$ and $R_1$ terminals. Consequently, the TA and G relays operate and remain operated as long as the bridge is maintained. It should be noted here that the bridge is maintained as long as low current is supplied to the $S_1$ terminal of the test distributor. If subsequently high current should be supplied to the $S_1$ terminal, the TD relay again operates and the aforementioned bridges resulting from the operation of the KD and SC relays are broken. As a result, the G relay becomes nonoperated and ground is removed from the $S_2$ terminal of the test distributor. As will be seen below, this results in the nonoperation of the aforementioned cut-off relay in the line circuit (FIG. 6A or 6B).

Line Circuit

Figure 6A:
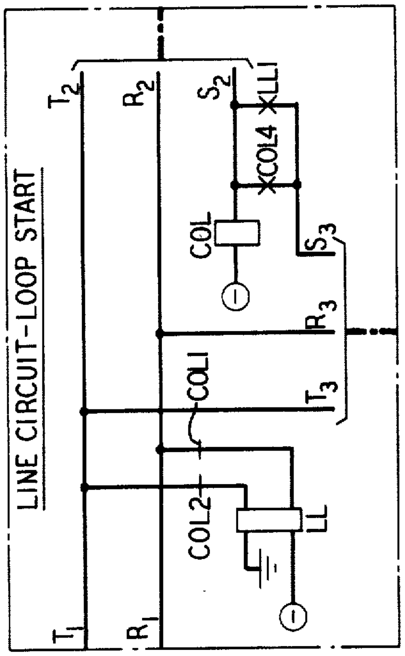
FIG. 6A shows a schematic diagram of a line circuit, for loop start operation, shown in FIG. 4.
Figure 6B:
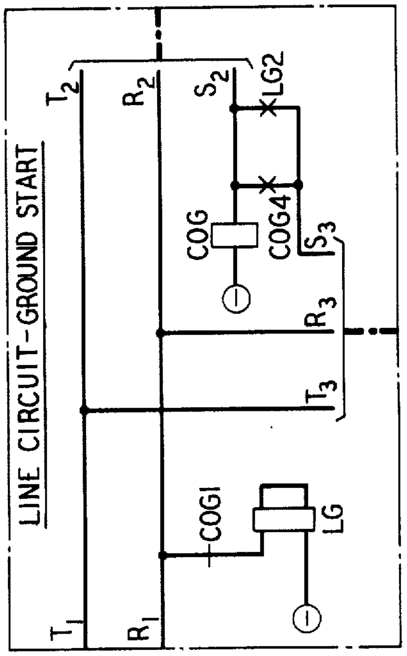
FIG. 6B shows a schematic diagram of a line circuit, for ground start operation, shown in FIG. 4.

A schematic diagram of the line circuit for loop start operation is shown in FIG. 6A. It can be seen that the relay LL supplies battery and ground to the $R_1$ and $T_1$ terminals, respectively, of the line circuit. These terminals are connected in the existing switching system 2 (FIG. 1) to the port of the existing switching system for the selected customer line. If prior to the operation of the COL relay, which is the aforementioned cut-off relay, a bridge is connected between the $T_1$ and $R_1$ terminals, the LL relay operates. Operation of the LL relay indicates a customer originated call and causes the line finder 207 (FIG. 4) to search for the originating customer line. If, however, prior to the operation of the LL relay, ground is supplied to the $S_2$ terminal of the line circuit (FIG. 6A), the COL relay operates, thereby removing the battery and ground priorly connected to the $R_1$ and $T_1$ terminals through the LL relay.

It is necessary that the battery and ground through the LL relay be removed as described above during many of the tests which are performed in applicants' arrangement. However, as indicated in connection with the discussion of the states of applicant's test trunk circuit (FIG. 3), some tests are performed to test the connection of the line circuit. In these tests the COL relay is nonoperated and the battery and ground through the LL relay are reconnected to the $R_1$ and $T_1$ terminals, respectively. It should be noted that battery and ground connected to the $R_1$ and $T_1$ terminals, respectively, are also connected to the $R_2$ and $T_2$ terminals, respectively.

In FIG. 6B a line circuit for ground start operation is shown. The operation of the circuit is similar to that of the loop start circuit shown in FIG. 6A. However, it should be noted that battery is supplied through the LG relay coil to the $R_1$ terminal. If ground should be connected to the $R_1$ terminal, the LG relay operates causing the line finder 207 (FIG. 4) to search for the originating customer line. If, however, prior to the operation of the LG relay, the COG (FIG. 6B) relay, the cutoff relay in this line circuit, operates the battery connection to the $R_1$ terminal through the LG relay coil is broken.

Line Verification Operation

With the above understanding of the elements of applicants' arrangements and the test access circuitry provided in the existing switching system 2 (FIG. 1), attention is now turned to the operation of applicants' invention where the existing switching system 2 is a step-by-step system as shown in FIG. 4. As mentioned above, initially data are entered by means of the TTY 145 (FIG. 2) to the central processor 100 specifying the customer lines to be tested. These data may be entered as a block of contiguous directory numbers to be selected for testing in sequence or as individual directory numbers. In either case, however, it is necessary to specifiy the test trunk to be used for each block on each individual line since not all test trunks are necessarily capable of accessing all directory numbers. More specifically, as was the case in connection with the existing switching system shown in FIG. 4, a test trunk may be capable of accessing any one of 10 thousand lines. If there are more than 10 thousand lines in the existing illustrative switching system 2 (FIG. 1) or for some other reason one of the test trunks is unable to access all the lines in the existing switching system 2, a particular test trunk for the lines to be tested must be specified. The test trunk is in fact specified by specifying an ESS trunk connected to the test trunk circuit (FIG. 3) which is connected to the necessary test trunk. After entry of these data, one of the specified customer lines is selected for testing.

At this point the instructions stored in the program store 102 (FIG. 2) effect a sequence of tests by sequentially specifying the state of the selected test trunk circuit (FIG. 3). More specifically, in response to the execution of instructions stored in program store 102 signals are generated by the signal distributor 136 specifying, as above described, the state to be assumed by the required test trunk circuit (FIG. 3).

The initial sequence of states of the test trunk circuit (FIG. 3) establishes a connection through the existing switching system 2 (FIG. 1) to the expected port for the selected customer line and through the switching network 120 (FIG. 2) to the expected port on the line link network 121 for the customer line. To accomplish the connection through the switching network 120, it is necessary to employ translations known in the prior art and stored in the call store 103. These translations specify such information as the line link network port or line link equipment number associated with the selected directory number for the customer line. In addition, information is also stored in the call store 103 indicating whether the directory number is an active number. If the number is not active, no test need be performed.

In addition to the establishment of the aforementioned connections through the existing switching system 2 (FIG. 1) and the electronic switching system 1, the initial sequence of states also determines the busy/idle status of the customer lines to which the respective switching system are connected.

More specifically, the initial sequence of states for the test trunk circuit (FIG. 3) is the following:

0–4–5–25–27–7–17.

It will be recognized that state 0 is the idle state for the test trunk circuit (FIG. 3). When the central control 101 (FIG. 2) commands the test trunk circuit (FIG. 3) to assume state 4, a dial pulse transmitter is connected to the test trunk circuit by means of the required ESS trunk and dial pulsing, as above described, is commenced. In addition, a connection from the required ESS trunk to the expected port on the line link network 121 (FIG. 2) is reserved.

Thereafter, the central control 101 (FIG. 2) commands the test trunk circuit (FIG. 3) to assume state 5 which is a brief holding state for the purpose of allowing the electronic switching system 1 (FIG. 1) to disconnect the dial pulse transmitter (FIG. 7) and to effect the connection between the ESS trunk and the expected customer line termination on the line link network 121 (FIG. 1). While the test trunk circuit (FIG. 7) is in the state 5, a resistance bridge is connected across the tip and ring of the test trunk to maintain the connections established by dial pulsing. The current on the sleeve of the test trunk remains high and thus the tip and ring of the test trunk are not cut through to the tip and ring of the customer line port in the existing switching system 2 (FIG. 1).

The state 5 is followed by the state 25. In this state, low current is supplied on the sleeve lead of the test trunk to the existing switching system 2 (FIG. 1). As a result, the tip and ring of the test trunk are cut through to the tip and ring of the existing switching system port for the selected customer line. If the existing switching system were other than the illustrative step-by-step switching system and the switching equipment were busy, a tone would be supplied on the top and ring of the test trunk to the test trunk circuit (FIG. 7). Presence of this tone would be indicated by the aforementioned tone detector 20 (FIG. 3) and testing would terminate for this line. Thereafter, another directory number would be selected and testing would be begun for the corresponding line. It should be noted that as was described in the previous discussion of the state 4, the same result obtains as just described when reverse battery is returned by a busy step-by-step system during dial pulsing.

The state immediately succeeding state 25 is the state 27 which is a transition state and is associated with no test. Following the state 27 the state 7 is assumed by the test trunk circuit (FIG. 3) under the command of the central control 101 (FIG. 2). In this state the aforementioned low current is maintained on the sleeve of the test trunk such that the tip and ring of the test trunk circuit (FIG. 7) are cut through to the tip and ring of the port on the existing switching system 2 (FIG. 1) for the selected customer line. It is also important to note that by virtue of the low sleeve current from the test trunk circuit, the cut-off relay in the line circuit associated with the selected customer line is operated. As a result battery potential and ground which may be supplied through the line relay LL (FIG. 6A) or LG (FIG. 6B) are removed.

In this state it will be recalled that the detecting relays, NT and NR (FIG. 3), are connected to the tip and ring of the test trunk. Thus, if the customer line connected to the test trunk by the existing switching system 2 (FIG. 2) is busy, the talking battery on that line causes one of the two relays, NT and NR, to operate. As mentioned above, central control 101 (FIG. 2) is apprised of the operation of either of the two relays by the trunk scanner 135. If either of the relays operates it is noted by central control 101 for future reference.

The test trunk circuit (FIG. 3) is next commanded by the central control 101 (FIG. 2) to assume the state 17. In this state it will be recalled the NT and NR relays are bridged on the tip and ring of the ESS trunk. It should be noted that when the connection through the switching network 120 was priorly established, the line ferrod for the customer line was disconnected from the line termination for the selected customer line. Thus, if either of the NT or NR relay operates, indicating presence of battery, that battery must be either talking bsttery or battery from a misconnected line circuit or line ferrod. In either case, presence of battery is considered a busy indication for the customer line.

If neither of the tests performed in the states 7 or 17 results in a busy line indication, a first sequence of subsequent tests is selected. If only one of the tests performed in the states 7 and 17 results in an indication that the customer line is busy it is assumed that there is a misconnection. As a result a trouble report identifying the customer line directory number is printed by the TTY 145 (FIG. 120). If, however, both tests performed in the states 7 and 17 consistently indicate busy line connections through both switching systems, a second sequence of subsequent tests is selected.

The aforementioned first sequence of subsequent tests is referred to as the idle line tests and consists of the states:

16–6–2–3–43–47–57–56–54–50–40–0.

As can be seen the first state assumed after the state 17 in this sequence of tests is the state 16. The state 16 is a transitional state in which no test is performed. Subsequent to the state 16, state 6 is assumed by the test trunk circuit (FIG. 3) under command of the central control 101 (FIG. 2). In this state low sleeve current is again supplied by the test trunk TT (FIG. 1) to the existing switching system 2 to maintain the cut-through condition of the test trunk tip and ring to the customer line tip and ring. Ground is connected by the test trunk circuit (FIG. 3) to the tip of the ESS trunk and battery is connected to the ring of that trunk. In addition, the NT and NR relays are bridged by the test trunk circuit (FIG. 3) across the tip and ring of the test trunk. Consequently, if the correct connection has been effected through the electronic switching system 1 (FIG. 1) to the main distributing frame 4 and on the main distributing frame 4 to the customer terminals and from the customer line terminals on the main distributing frame 4 to the existing switching system 2 line connections, the NR relay in the test trunk circuit (FIG. 3) operates. If a reversal of the connection of the tip and ring has occurred anywhere along that path, the NT relay operates. The data indicating the operation of the NR and NT relays are stored in the central processor 100 (FIG. 2) for future reference.

Following the state 6, the state 2 is assumed by the test trunk circuit (FIG. 3) under command of the central control 101 (FIG. 2). In this state the battery and ground connections to the tip and ring of the ESS trunk are reversed while the NT and NR relays are still bridged by the test trunk circuit (FIG. 3) onto the tip and ring of the test trunk. Thus, if the NR relay was properly operated during the state 6, the NT relay should operate in this state. If such is the case it is assumed that a proper connection of the electronic switching system 1 (FIG. 1) to the desired customer line has been effected.

If, however, in the preceding test the NT relay operated, the NR relay should not operate. If that be the case, it is assumed that at some point in the connection path a tip-ring reversal exists and an indication to that effect is printed on the TTY 145 (FIG. 2) for the particular customer line. If in either of the states 6 and 2 neither of the NT and NR relays operate, the expected continuous path does not exist as required. Consequently a misconnection exists and an indication to that effect is printed on the TTY 145.

If the tests performed in the preceding states have indicated that the connection of the customer line to the electronic switching system 1 (FIG. 1) is correct, the state 3 is assumed by the test trunk circuit (FIG. 3) under command of the central control 101 (FIG. 2). Concurrently the central control 101 causes the line ferrod for the selected customer line to be reconnected to the customer line for the purpose of testing it for a loop start configuration. In the test trunk circuit (FIG. 3) as above described, NT and NR relays are bridged across the tip and ring of the test trunk. In addition, the sleeve lead current supplied by the test trunk to the existing switching system 2 (FIG. 1) is low current thereby maintaining the cut-through condition of the tip and ring through that switching system. If the line ferrod is correctly configured for loop start operation, the NR relay operates. If the line ferrod is configured for ground start operation, no relay operates. Data indicating operation of either of the relays is stored by the central processor 100 (FIG. 1) for future reference.

Subsequent to the state 3 the state 43 is assumed by the test trunk circuit (FIG. 3) under command of the central control 101 (FIG. 2). The line ferrod for the customer line is still reconnected to that line and the NT and NR relays are bridged across the tip and ring of the test trunk. In this instance, if the line ferrod is properly configured for ground start operation, the NR relay operates. Data indicating the operational state of the two relays are stored in the central processor 100 (FIG. 2) for reference.

Following the state 43, state 47 is assumed as a transitional state. Subsequently the state 57 is assumed by the test trunk circuit (FIG. 3) under the command of central control 101 (FIG. 2). It is important to note here that the sleeve of the test trunk supplies high current to the existing switching system 2 (FIG. 1). In this instance, as above described in connection with the discussion of the test distributor (FIG. 5A), the CT relay becomes nonoperated removing the cut-through condition previously discussed and the line relay (FIG. 6A or 6B) is reconnected to the customer line. More specifically, the cut-off relay shown in the FIG. 6A or 6B in the line circuit becomes nonoperated.

In this state the NT and NR relays are bridged across the ESS trunk tip and ring. If the line circuit in the existing switching system 2 (FIG. 1) is configured for ground start operation the NR relay operates. Data indicating the operational state of the relays are stored by the central control 101 (FIG. 2) for future reference.

Following the state 57 the state 56 is assumed under command of the central control 101 (FIG. 2). In this state, as was the case in the state 57, high current is supplied on the sleeve lead of the test trunk to the existing switching system 2 (FIG. 1). In addition, the NT and NR relays are bridged across the tip and ring of the ESS trunk by the test trunk circuit (FIG. 3). If the line circuit is configured for loop start operation as shown in FIG. 6A, one of the two relays operates. Data indicating the operational states of the NT and NR relay are stored. The data stored in response to the tests performed in states 3, 43, 57, and 56 are then compared to determine if the results are consistent. That is, it is necessary to determine if both the line circuit and line ferrod are wired for loop or ground start configuration. Inconsistent results produce a trouble indication printed by the TTY 145 (FIG. 2).

Following the state 57 the transition states 56, 54, 50, and 40 are assumed prior to the idle state 0. When the idle state 0 is assumed under command of the central control 101 (FIG. 2), testing for the selected customer line is complete. Thereafter, another directory number is selected.

In the above it was mentioned that if, as a result of the tests performed in the first sequence of states, it is determined that the selected customer line is busy, a second sequence of subsequent states is assumed by the test trunk circuit (FIG. 3). This second sequence of states consists of the following:

13–11–1–0.

It should be noted that the state 13 is assumed following the above described state 17. In the state 13 a DC to DC converter 21 (FIG. 3) is connected between the ESS trunk and the test trunk by the test trunk circuit. The negative terminal of the converter 21 (FIG. 3) is connected through resistances to the top and ring of the test trunk. The positive terminal of the converter 21 is connected through the polar relays NT and NR to the tip and ring, respectively, of the ESS trunk. In addition, low sleeve current is supplied by the test trunk circuit to the existing switching system 2 (FIG. 1). As a result a complete conduction path should exist from the ESS trunk to the test trunk. If such be the case even though the line is busy, both of the relays NT and NR operate. Operation of both relays is indicated to the central control 101 (FIG. 2) by the trunk scanner 135 and is interpreted by the central control 101 as indicating a proper connection of the electronic switching system 1 (FIG. 1) to the selected customer line. As noted above, while a DC to DC converter is used in this instance together with polar relays, an AC signal generator could be employed in like manner in conjunction with means for detecting the generated AC signal to perform this function.

Following the state 13 the state 11 is assumed under command of the central control 101 (FIG. 2) in preparation for disconnecting the test trunk circuit (FIG. 3). Thereafter the state 1 and finally the idle state 0 is assumed by the test trunk circuit under command of the central control 101 (FIG. 2).

Conclusion

In the above, applicants have disclosed an illustrative embodiment of their invention comprising an electronic switching system equipped with a plurality of test trunk circuits useful in verifying the proper connection of customer lines to the electronic switching system. It should be noted that while the operation of applicants' invention has been discussed in conjunction with only one of the test trunk circuits, a plurality of such trunk circuits may be employed simultaneously to test a plurality of customer lines. Moreover, it should be observed that many additional embodiments of applicants' invention equally well within its spirit and scope will be apparent to those skilled in the art upon reading this application.

What is claimed is:

1. A test trunk circuit for a communication switching system comprising: a first trunk port; a second trunk port; detector means; means for establishing a potential difference between said second trunk port and a reference terminal; and means responsive to control signals of said communication system for coupling said detector means to said first trunk port and to said reference terminal.

2. A communication switching system comprising:
- a plurality of test trunk circuits; and means for generating control signals at a plurality of control signal terminals;
- said test trunk circuits each comprising: first detection means for detecting current flow of at least a specified amplitude; second detection means for detecting current flow of at least said specified amplitude; each of said detection means comprising a current input terminal and a current output terminal; a first trunk port comprising tip and ring terminals; a second trunk port comprising tip and ring terminals; generating means for generating a potential difference between first and second terminals thereof; means including means connected to certain of said control signal terminals for connecting said first terminal of said generating means to said current input terminals of said first and second detection means, for connecting said current output terminals of said first and second detection means to said tip and ring terminals, respectively, of said first trunk port and for connecting said second terminal of said generating means to said tip and ring terminals of said second trunk port.

3. A trunk circuit for a communication switching system comprising:
- a plurality of control signal input terminals;
- a first turnk port comprising tip and ring terminals;
- a second trunk port comprising tip, ring, and sleeve terminals;
- signal detector means;
- first resistance means;
- second resistance means; and
- means including means connected to certain of said control signal input terminals for selectively connecting said signal detector means to said tip and ring terminals of said first trunk port and to said tip and ring terminals of said second trunk port and further including means for selectively connecting a potential source to said sleeve terminal through said first resistance means and through the combination of said first and said second resistance means.

4. A trunk circuit for a communication switching system comprising:
- a first trunk port comprising tip and ring terminals;
- a seocnd trunk port comprising tip, ring, and sleeve terminals;
- a first polar relay having first and second terminals;
- a second polar relay having first and second terminals;
- resistance means;
- a signal generator for generating a potential between first and second terminals thereof;
- means for connecting said first terminals of said first and second polar relays to said tip and ring terminals, respectively, of said first trunk port;
- means for connecting said second terminals of said first and second polar relays to said first terminal of said signal generator;
- means for connecting said second terminal of said signal generator to said tip and ring terminals of said second trunk port; and
- means for connecting a potential source through said resistance means to said sleeve terminal of said second trunk port.

5. A communication switching system comprising:
- a plurality of line circuits; a plurality of trunk circuits; a switching network connected to said line circuits and said trunk circuits for selective interconnection thereof under the control of network command signals; scanning means under the control of scanner command signals for generating output signals defining the states of sensing elements connected thereto;
- a control arrangement comprising means for generating said network command signals, means for generating said scanner command signals and means for generating control signals;
- said trunk circuits each comprise a plurality of sensing circuits connected to said scanning means and a plurality of control elements connected to said control arrangement and responsive to said control signal, the states of said control elements of a trunk circuit in combination defining a plurality of different transmission and control configuration states of said trunk circuit, the control arrangement being responsive to said output signals of said scanning means for selectively controlling the control elements of said trunk circuits and for controlling said switching network; and
- at least one of said trunk circuits comprises a test trunk circuit comprising: a first trunk port connected to said switching network, a second trunk port for connection to a test trunk of another switching system, detector means and certain configuration states of said test trunk circuit serve to selectively couple said detector means to said first trunk port and to said second trunk port.

6. A communication switching system in accordance with claim 5 wherein said test trunk circuit further comprises a source of potential comprising first and second output terminals and one configuration state of said test trunk circuit serves to couple said first output terminal of said potential source to said second trunk port and to couple said detector means to said first trunk port and to said second output terminal of said source of potential.

* * * * *

UNITED STATES PATENT AND TRADEMARK OFFICE
CERTIFICATE OF CORRECTION

PATENT NO. : 3,892,928

DATED : July 1, 1975

INVENTOR(S) : Russell Carson Casterline, Zbigniew Apoloniusz Krawiec and Ralph Broman Peterson It is certified that error appears in the above-identified patent and that said Letters Patent are hereby corrected as shown below:

Column 1, line 28, "stitching system" should read --switching system--.
Column 6, line 20, "trunk circuits" should read --trunk circuit--; line 21, "trunk line network" should read --trunk link network--.
Column 7, line 11, "be therein" should read --be seen therein--.
Column 8, line 48, "pushing is complete" should read --pulsing is complete--.
Column 10, line 15, "the transistion of" should read --the transition of--.
Column 13, line 3, "indicated previously" should read --indicated as previously--.
Column 19, line 3, "switching system" should read --switching systems--; line 41, "the top and" should read --the tip and--.
Column 20, line 21, "bsttery or" should read --battery or--.
Column 21, line 12, "should not operate" should read --should now operate--.
Column 22, line 39, "the top and" should read --the tip and--.
Column 23, line 49, "first turnk port" should read --first trunk port--.
Column 24, line 3, "seocnd trunk port" should read --second trunk port--.

Signed and Sealed this

*twenty-ninth* Day of *June 1976*

[SEAL]

*Attest:*

RUTH C. MASON
*Attesting Officer*

C. MARSHALL DANN
*Commissioner of Patents and Trademarks*